(12) United States Patent
Fei

(10) Patent No.: US 11,846,878 B2
(45) Date of Patent: Dec. 19, 2023

(54) SHIELDING ELEMENT FOR BRIDGE TYPE CONTACT POWER SUPPLY LENS AND ELECTRONIC DEVICE

(71) Applicant: SHEN ZHEN FUNDER ELECTRONICS LTD, Shenzhen (CN)

(72) Inventor: Fei Fei, Shenzhen (CN)

(73) Assignee: SHEN ZHEN FUNDER ELECTRONICS LTD, Shenzhen (CN)

( * ) Notice: Subject to any disclaimer, the term of this patent is extended or adjusted under 35 U.S.C. 154(b) by 109 days.

(21) Appl. No.: 17/743,712

(22) Filed: May 13, 2022

(65) Prior Publication Data

US 2023/0205050 A1    Jun. 29, 2023

(30) Foreign Application Priority Data

Dec. 24, 2021   (CN) .......................... 202111608860.X

(51) Int. Cl.
*G03B 5/06* (2021.01)
*G03B 9/02* (2021.01)
*G03B 13/02* (2021.01)

(52) U.S. Cl.
CPC .................. *G03B 5/06* (2013.01); *G03B 9/02* (2013.01); *G03B 13/02* (2013.01); *G03B 2205/0069* (2013.01)

(58) Field of Classification Search
CPC ........ H04N 23/50; H04N 23/57; H04N 23/65; H04N 23/53; H04N 23/55; G03B 13/02; G03B 9/02; G03B 5/06; G03B 11/04; G03B 2205/0069
See application file for complete search history.

(56) References Cited

U.S. PATENT DOCUMENTS

| 2013/0278785 A1* | 10/2013 | Nomura | H04N 5/2254 |
| | | | 348/208.11 |
| 2018/0054565 A1* | 2/2018 | Smith | H04N 23/80 |
| 2022/0021791 A1* | 1/2022 | Imai | H04N 23/57 |

FOREIGN PATENT DOCUMENTS

| CN | 214675345 | * | 11/2021 |
| TW | 610193 | * | 4/2021 |

* cited by examiner

*Primary Examiner* — Kelly L Jerabek
(74) *Attorney, Agent, or Firm* — Westbridge IP LLC

(57) ABSTRACT

Disclose is a shielding element for bridge type contact power supply lens provided on a PCB of an electronic device and covering a camera of the electronic device, comprising: a mounting base, a light shielding piece, a driving assembly, a metal reinforcing plate and a contact conductive copper piece; the driving assembly comprising a swing arm rotatably connected with the mounting base, the swing arm being connected with the light shielding piece; the swing arm rotating to drive the light shielding piece to move back and forth between a first position and a second position; wherein when the light shielding piece is located in the first position, the light shielding piece covers on a side of the viewfinder hole away from the camera, and when the light shielding piece is located in the second position, the camera is exposed from the viewfinder hole.

10 Claims, 4 Drawing Sheets

SHIELDING ELEMENT FOR BRIDGE TYPE CONTACT POWER SUPPLY LENS AND ELECTRONIC DEVICE

CROSS-REFERENCE TO RELATED APPLICATIONS

The present application claims priority to Chinese Patent Application No. 202111608860.X, titled "Shielding Element For Bridge Type Contact Power Supply Lens And Electronic Device" and filed on Dec. 24, 2021, which is hereby incorporated for reference in its entirety for all purposes.

TECHNICAL FIELD

The present application relates to the technical field of motors, in particular to a bridge type contact power supply lens shielding element and an electronic device.

BACKGROUND

With the popularity of computers, smart phones, home cameras, tablets and other electronic devices, some apps with permissions of using the camera may start the camera sometime to shoot the surrounding environment or even record videos, which is prone to let out users' personal privacy information and has potential safety hazards.

Therefore, it is necessary to provide a new bridge type contact power supply lens shielding element and an electronic device to solve the above technical problems.

SUMMARY

The main purpose of the present application is to provide a bridge type contact power supply lens shielding element and an electronic device, which aims to solve the problem that the camera of the electronic device is easy to expose the privacy of users and has potential safety hazards.

In order to achieve the above purpose, the present application provides a bridge type contact power supply lens shielding element, provided on a Printed Circuit Board (PCB) of an electronic device and covering a camera of the electronic device, comprising: a mounting base covering the camera, and a viewfinder hole provided on the mounting base corresponding to a viewfinder side of the camera; a light shielding piece slidably connected with the mounting base; a driving assembly comprising a driving mechanism and a swing arm rotatably connected with the mounting base, the swing arm being connected with the light shielding piece, and the driving mechanism being configured to drive the swing arm to rotate to drive the light shielding piece to move back and forth between a first position and a second position; two metal reinforcing plates provided on two opposite sides of the camera, and embedded in the mounting base; and a contact conductive copper piece passing through the mounting base, one end of the contact conductive copper piece being conductive with the driving mechanism, and another end of the contact conductive copper piece being abutted against a conductive contact point of the PCB, wherein when the light shielding piece is located at the first position, the light shielding piece covers the viewfinder hole a side of the viewfinder hole away from the camera, when the light shielding piece is located at the second position, the camera is exposed from the viewfinder hole.

Optionally, the mounting base is integrally-formed, and the metal reinforcing plates are provided in the mounting base; or the mounting base is provided with mounting grooves matched with the metal reinforcing plates, and the metal reinforcing plates are embedded in the mounting grooves in an one to one correspondence.

Optionally, the contact conductive copper piece comprises a substrate and a abutting part connected with the substrate, a width of the abutting part is greater than a width of the substrate, the substrate passes through the mounting base, and an end of the substrate away from the abutting part is connected with the driving mechanism; the abutting part is exposed from the mounting base, and bent to form a contact surface abutted against the conductive contact point.

Optionally, the swing arm comprises a cylindrical part, an extension arm and a traction part; wherein the mounting base is provided with a positioning shaft and the cylindrical part is sleeved on the positioning shaft; wherein the extension arm is extended from an outer wall of the cylindrical part and extended outward along a radial direction of the cylindrical part; wherein the traction part is provided at an end of the extension arm away from the cylindrical part, the traction part passes through a sliding groove on the light shielding piece.

Optionally, the swing arm further comprises a limit blocking piece connected with the traction part, and the light shielding piece is located between the limit blocking piece and the extension arm.

Optionally, the driving mechanism comprises an iron core and coils, the iron core comprises a base and two opposite connecting arms, the base is connected between ends of the two connecting arms, and the coils are sleeved on the two connecting arms in an one by one correspondence, an end of each connecting arm away from the base is arc-shaped and form a mounting position between the two connecting arms; and wherein the swing arm also comprises an annular magnet provided coaxially with the cylindrical part, and the magnet is provided at the mounting position.

Optionally, the swing arm further comprises a sleeve part provided at an end of the cylindrical part and rotatably sleeved on the positioning shaft, and the magnet is fixedly sleeved on the sleeve part.

Optionally, a side of the mounting base away from the camera is provided with a groove communicated with the viewfinder hole, a bottom wall of the groove forms step surfaces on both sides of the viewfinder hole of the mounting base, limit blocks are provided on both side walls of the groove, and the light shielding piece is located among the step surfaces and the limit blocks.

Optionally, the shielding element for the bridge type contact power supply lens further comprises a cover plate provided with an avoidance hole corresponding to the viewfinder hole, the cover plate is provided on a side of the mounting base away from the camera, and buckled with the mounting base.

In addition, the present application also provides an electronic device, comprising the bridge type contact power supply lens shielding element as mentioned above.

In the technical solution of the present application, the first position is a shielding position and the second position is a starting position. The mounting base provides a mounting position, and prevents the internal structure such as a camera, a driving assembly, a light shielding piece, etc. from collision and dust. The swing arm in the driving assembly pulls the light shielding piece to slide along the front and back direction. When the user starts the camera, the camera is started and the light shielding piece is moved to the second position, so that the camera can obtain light from the viewfinder hole to ensure the normal use of the camera;

when the user does not start the camera, the light shielding piece is moved to the first position to shield the viewfinder hole. Even if the camera is started, the picture cannot be obtained. Thus, the camera can be prevented from secretly shooting or peeping at the surrounding environment or even recording video without the user's knowledge, so as to protect the user's personal privacy information and security.

BRIEF DESCRIPTION OF THE DRAWINGS

In order to more clearly explain the embodiments of the present application or the technical solutions in the related art, the following will briefly introduce the drawings in the embodiments or the description of the related art. It is obvious that the drawings in the following description are only some embodiments of the present application. For those skilled in the art, other drawings can be obtained according to the structure shown in these drawings without paying creative labor.

Figure 1:
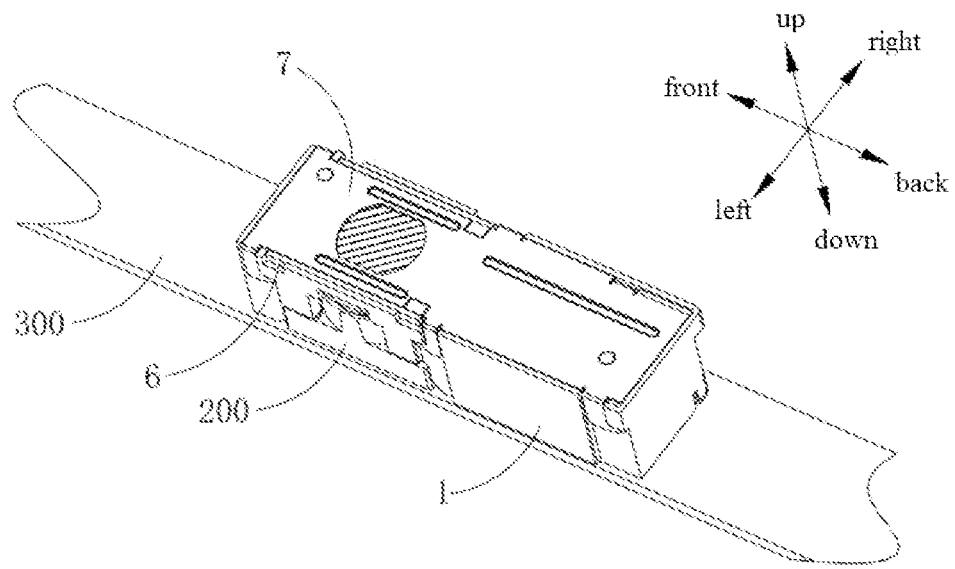
FIG. 1 is a structural diagram of a bridge type contact power supply lens shielding element in an embodiment of the present application.
Figure 2:
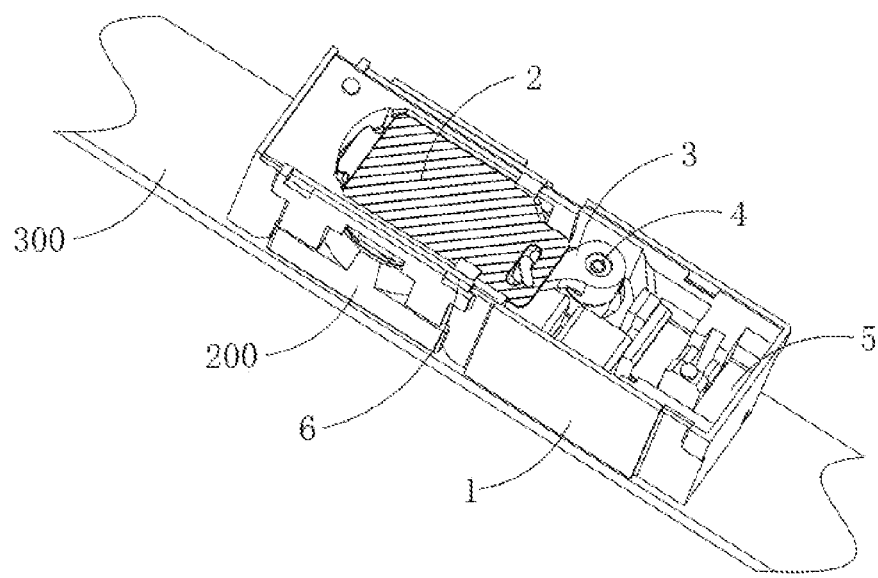
FIG. 2 is a structural diagram of the bridge type contact power supply lens shielding element in the embodiment of the present application, with a cover plate is removed.

The realization of the purpose, functional features and advantages of the present application will be further described with reference to the attached drawings in combination with the embodiments.

DETAILED DESCRIPTION OF THE EMBODIMENTS

The technical solution in the embodiment of the present application will be clearly and completely described below in combination with the attached drawings in the embodiment of the present application. Obviously, the described embodiments are only part of the embodiments of the present application, not all of the embodiments. Based on the embodiments in the present application, all other embodiments obtained by those skilled in the art without creative work belong to the claimed scope of the present application.

It should be noted that if the embodiment of the present application involves directional indication (such as up, down, left, right, front, back . . . ), the directional indication is only used to explain the relative position relationship and movement among components in a specific attitude (as shown in the attached drawings). If the specific attitude changes, the directional indications will change accordingly.

In addition, in the present application, the description of "first", "second" and the like is only for descriptive purposes, and cannot be understood as indicating or implying its relative importance or implicitly indicating the number of indicated technical features. Thus, the features defined with "first" and "second" may include at least one of the features explicitly or implicitly. In the description of the present application, "multiple" means at least two, such as two, three, etc., unless otherwise specifically defined.

In the present application, unless otherwise specified and limited, the terms "connection", "fixed" and the like should be understood in a broad sense. For example, "fixed" can be fixed connection, detachable connection or integrated; it can be mechanical connection or electrical connection; it can be directly connected or indirectly connected through an intermediate medium. It can be the connection within two elements or the interaction relationship between two elements, unless otherwise clearly defined. For those skilled in the art, the specific meaning of the above terms in the present application can be understood according to the specific situation.

In addition, the technical solutions of various embodiments of the present application can be combined with each other, but it must be based on the realization of those skilled in the art. When a combination of technical solutions is contradictory or impossible, it should be considered that the combination of technical solutions does not exist and is not within the claimed scope of the present application.

As shown in FIGS. 1 to 6, in an embodiment of the present application, a bridge type contact power supply lens shielding element 100 is provided on a PCB 300 of an electronic device and covers a camera 200 of the electronic device. The bridge type contact power supply lens shielding element 100 includes a mounting base 1, a light shielding piece 2, a driving assembly 3, a metal reinforcing plate 6 and a contact conductive copper piece 5. The mounting base 1 covers the camera 200, and provided with a viewfinder hole 11 corresponding to a viewfinder side of the camera 200. The light shielding piece 2 is slidably connected with the mounting base 1. The driving assembly 3 includes a driving mechanism and a swing arm 31 rotatably connected with the mounting base 1. The swing arm 31 is connected with the light shielding piece 2. The driving mechanism is configured to drive the swing arm 31 to rotate to drive the light shielding piece 2 to move back and forth between a first position and a second position. Two metal reinforcing plates 6 are provided on two opposite sides of the camera 200, and embedded in the mounting base 1. The contact conductive copper piece 5 passes through the mounting base 1, with one end electrically connected with the driving mechanism, and the other end abutted against a conductive contact point on the PCB 300. When the light shielding piece 2 is located at the first position, the light shielding piece 2 covers the viewfinder hole 11 at a side of the viewfinder hole 11 away from the camera 200. When the light shielding piece 2 is located at the second position, the camera 200 is exposed from the viewfinder hole 11.

In the above embodiment, the first position is a shielding position and the second position is a starting position. The mounting base provides a mounting position, and prevents internal structures such as the camera, the driving assembly 3, the light shielding piece 2, etc. from collision and dust. The swing arm 1 in the driving assembly 3 pulls the light shielding piece 2 to slide along the front and back direction. When the user uses the camera 200, the camera 200 is started and the light shielding piece 2 is moved to the second position, and the camera 200 can obtain light from the viewfinder hole 11 to ensure the normal use of the camera 200. When the user does not use the camera 200, the light shielding piece 2 is moved to the first position to shield the viewfinder hole 11. Even if the camera 200 is started, the camera 200 cannot obtains the picture and can be prevented from secretly shooting or peeping at the surrounding environment or even recording video without the user's knowledge, and the user's personal privacy information and security is protected.

In addition, the metal reinforcing plates 6 are embodied on both sides of the camera 200, the strength of the mounting base 1 is improved to avoid deformation or damage of the mounting base 1, and the overall strength can be guaranteed when a width of the mounting base 1 needs to be consistent with the size of the camera 200, and a volume of the bridge contact power supply lens shielding element 100 can be reduced as much as possible. There will be no damage due to the thinning of a housing part on both sides of the camera 200. The contact conductive copper piece is abutted against the PCB, the wires is omitted, the tidiness of the bridge type contact power supply lens shielding element 100 is improved, and the mounting difficulty and maintenance difficulty of the bridge type contact power supply lens shielding element 100 is reduced.

The metal reinforcing plate 6 includes a base plate and insertion parts distributed at both ends of the base plate, and the metal reinforcing plate 6 has a shape fitted with a side shape of the housing part. The metal reinforcing plates 6 can be embedded in the mounting base during an injection molding of the mounting base, or mounting grooves matched with the technical reinforcing plates can be provided on the mounting base. After the processing of the mounting base is completed, the metal reinforcing plates can be embedded to the mounting grooves one by one.

Based on the above embodiment, the contact conductive copper piece 5 includes a substrate 51 and an abutting part 52 connected with the base plate. A width of the abutting part 52 is greater than a width of the substrate 51, and the substrate 51 is passed through in the mounting base 1. An end of the substrate 51 away from the abutting part 52 is connected with the driving mechanism. The abutting part 52 is exposed from the mounting base 1, and the abutting part 52 is bent to form a contact surface abutted against the conductive contact point on the PCB 300. Since the width of the abutting part 52 is larger than the width of the substrate 51, there is a step structure or transition surface at the connection position between the abutting part 52 and the substrate 51. When the abutting part 52 is abutted against the conductive contact point on the PCB 300, the step structure or the transition surface can limit the contact conductive copper piece 5 and prevent the contact conductive copper piece 5 from displacement by force and resulting in the instability of the connection position. The abutting part 52 is bent to form a contact surface, which is equivalent to increasing the contactable conductive area. Even if there is a position deviation during assembly, it can ensure the conduction of the PCB 300 and the driving mechanism.

Figure 4:
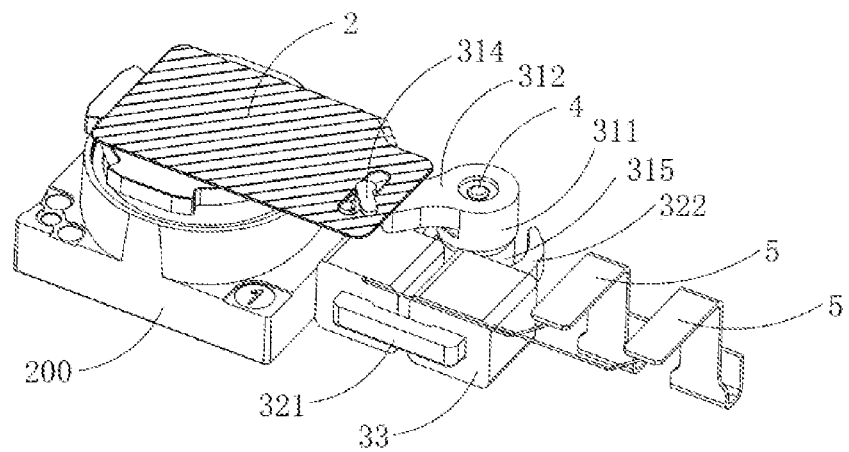
FIG. 4 is a schematic diagram of a connection structure between a driving assembly and a light shielding piece in the embodiment of the present application.
Figure 5:
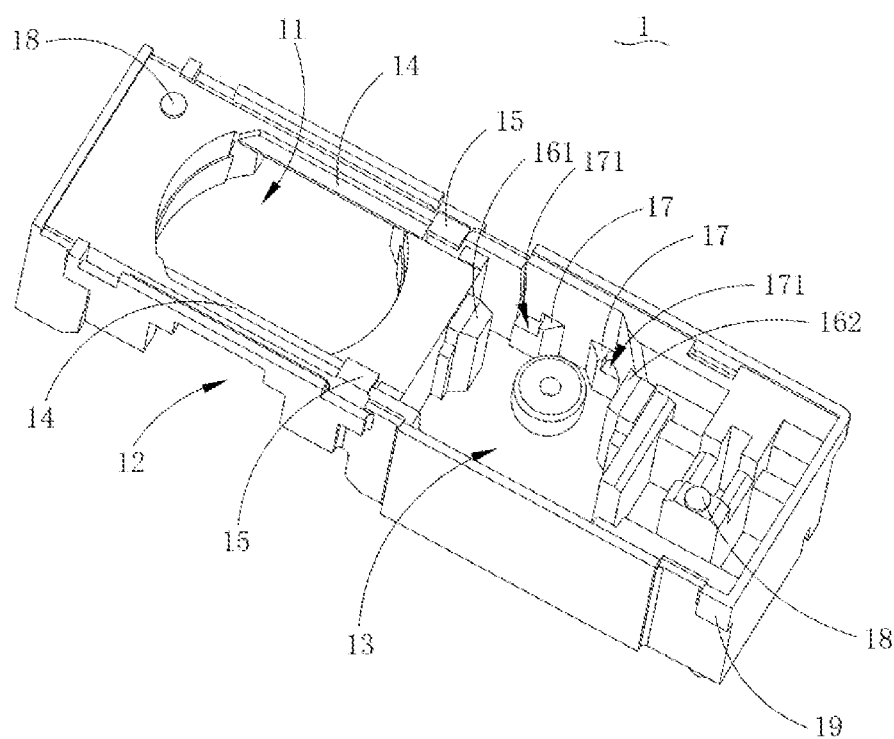
FIG. 5 is a structural diagram of a mounting base in the embodiment of the present application.

Referring to FIG. 4 and FIG. 5, the mounting base 1 includes a housing part and a base part. The housing part is provided with a containing cavity 12 matched with a shape of the camera 200, and the viewfinder hole 11 is communicated with the containing cavity 12. The camera 200 is provided in the containing cavity 12, and the viewfinder side of the camera 200 is provided upward. The base is provided with a mounting cavity 13 with an opening facing upward, and the driving assembly 3 is provided in the mounting cavity 13. When the swing arm 31 swings toward the camera 200, the swing arm 31 pushes the light shielding piece 2 to move to the second position, and when the swing arm 31 swings away from the camera 200, the swing arm 31 pulls the light shielding piece 2 to move to the first position.

Figure 3:
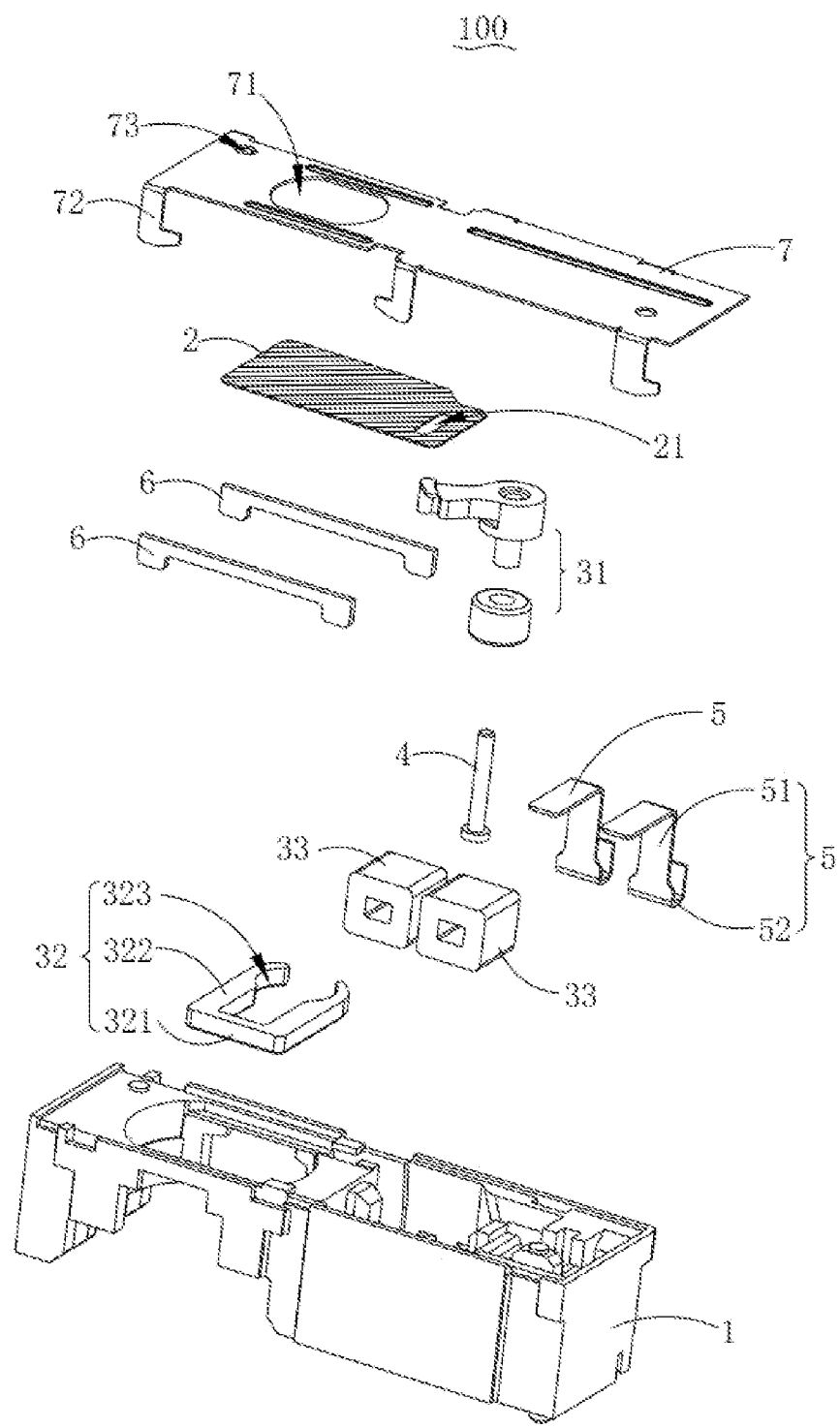
FIG. 3 is an exploded view of the bridge type contact power supply lens shielding element in the embodiment of the present application.
Figure 6:
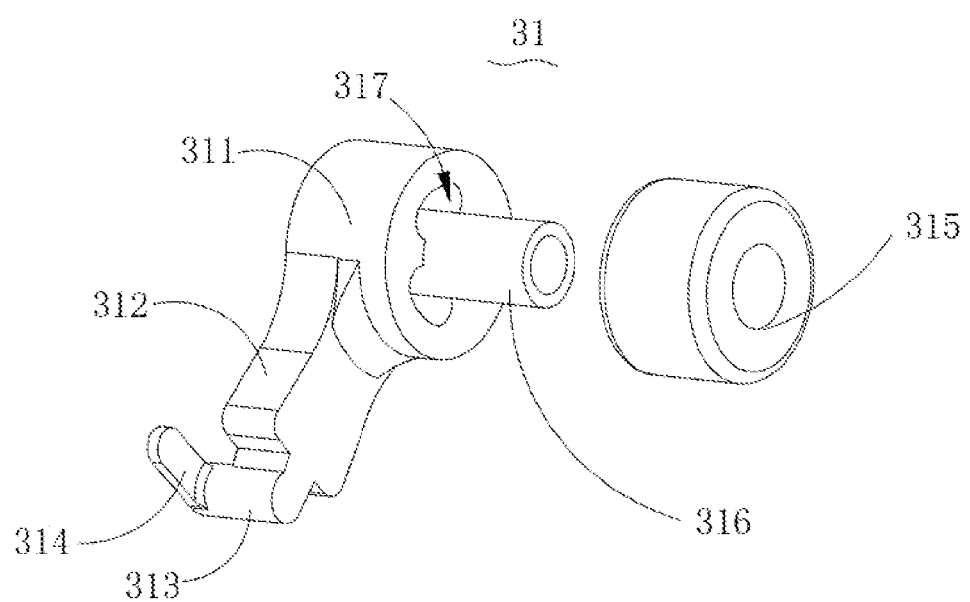
FIG. 6 is a structural diagram of a swing arm in the embodiment of the present application.

Referring to FIG. 3 and FIG. 6, the swing arm 31 includes a cylindrical part 311, an extension arm 312 and a traction part 313. A positioning shaft 4 is provided on the mounting base 1, and the cylindrical part 311 is sleeved on the positioning shaft 4. The extension arm 312 is extended from an outer wall of the cylindrical part 311 and extended outward along a radial direction of the cylindrical part 311. The traction part 313 is provided at an end of the extension arm 312 away from the cylindrical part 311. The light shielding piece 2 is provided with a sliding groove 21, and the traction part 313 passes through the sliding groove 21. When the swing arm 31 swings toward the camera 200, the traction part 313 moves, relative to the light shielding piece 2, to the right along the sliding groove 21. At this time, the traction part 313 is abutted against an upper side wall of the sliding groove 21 and provides a forward component force to push the light shielding piece 2 to move forward. On the contrary, the swing arm 31 drives the light shielding piece 2 to swing away from the camera 200, and convert the rotation of the swing arm 31 into the movement of the light shielding piece 2 in the front and back direction.

Based on the above embodiment, the swing arm 31 may also include a limit blocking piece 314 connected with the traction part 313, and the light shielding piece 2 is located between the limit blocking piece 314 and the extension arm 312. The limit blocking piece 314 and the extension arm 312 do not need to provide a clamping force to clamp the light shielding piece 2. The limit blocking piece 314 can prevent the light shielding piece 2 from moving upward and separating from the traction part 313, and ensure the connection stability between the swing arm 31 and the light shielding piece 2.

In other embodiments, the swing arm 31 can also be connected with the light shielding piece 2 through a connecting rod or a cam, so that the swinging of the swing arm 31 can drive the light shielding piece 2 to move in the front and back directions.

Referring to FIG. 5 again, the mounting cavity 13 is provided with a first limit piece 161 and a second limit piece 162. When the light shielding piece 2 is located at the first position, the extension arm 312 is abutted against the first limit piece 161. When the light shielding piece 2 is located in the second position, the extension arm 312 is abutted against the second limit piece 162. The first position and the second position of the light shielding piece 2 are determined by the first limit piece 161 and the second limit piece 162 to prevent the swing arm 31 from rotating too much or not in place and ensure that the camera 200 can be completely exposed when the light shielding piece 2 is located in the first position without affecting its function. At the same time, when the light shielding piece 2 is located at the second position, the light shielding piece 2 can completely shield the camera 200 and prevent privacy leakage.

In one embodiment, the driving mechanism includes an iron core 32 and a coil 33, and the iron core 32 includes a base 321 and two opposite connecting arms 322. The base 321 is connected between ends of the two connecting arms. A coil 33 is sleeved on each connecting arm 322, and one end of each connecting arm 322 away from the base 321 is arc-shaped to form a mounting position between the two connecting arms 322. The swing arm 31 also includes an annular magnet 315 coaxially provided with the cylindrical part 311, and the magnet 315 is provided at the mounting position. That is, there is two arc notch 323 distributed on two opposite sides of the two connecting arms 322, and the mounting position is located between the two arc notches 323. When the coil 33 is energized, the two connecting arms 322 form a magnetic field at the mounting position, and the magnet 315 drives the swing arm 31 to rotate under the action of the magnetic field, and thus drive the light shielding piece 2 to slide forward. By changing a direction of current, the direction of the magnetic field formed at the mounting position is changed, thus the magnet 315 drives the swing arm 31 to rotate under the action of the magnetic field and drive the light shielding piece 2 to slide backward. That is, in this embodiment, the swing arm 31 is driven to rotate by electromagnetic method to ensure the smoothness when the light shielding piece 2 slides. In other embodiments, the swing arm 31 can also be driven to rotate relative to the positioning shaft 4 by a motor, a cylinder or another driving method.

Referring to FIG. 6 again, the swing arm 31 also includes a sleeve part 316 provided at an end of the cylindrical part 311, the sleeve part 316 is rotatably sleeved on the positioning shaft 4, and the magnet 315 is fixedly sleeved on the sleeve part 316. Thus, it is ensured that the positioning shaft 4, the cylindrical part 311, the sleeve part 316 and the magnet 315 are coaxial, and thus the rotation center is consistent. In addition, a side of the cylindrical part 311 facing the magnet 315 is provided with a glue storage tank 317. There is a plurality of the glue storage tanks 317, and the plurality of glue storage tanks 317 are provided at intervals along a periphery of the sleeve part 316, thus the reliable connection stability between the swing arm 31 and the magnet 315 is maintained.

Specifically, the first limit piece 161 and the second limit piece 162 are provided outside of the two connecting arms 322 and the two connecting arms are placed between the first limit piece 161 and the second limit piece 162, the first limit piece 161 and the second limit piece 162 are configured to limit a displacement of the iron core 32 in the front-back direction, the left and right side walls of the mounting cavity 13 are configured to limit a displacement of the iron core 32 in the left-right direction, a bottom wall of the mounting cavity 13 is also provided with a limit step 17, and the limit step 17 is provided with a limit groove 171 matched with an end of the connecting arm 322. The left side wall of the mounting cavity 13 is also provided with a limit block configured to limit a displacement of the iron core 32 in an up-down direction. Therefore, the full positioning of the iron core 32 is realized, the iron core 32 is prevented from cranking or overturning in the mounting cavity 13, and the stability of the magnetic field formed by the coil 33 is ensured, and the front and back sliding of the light shielding piece 2 is consistent. Therefore, the light shielding piece 2 can be fully in place when sliding to the first position, and the camera 200 is completely shielded.

A side of the mounting base 1 away from the camera 200 is provided with a groove communicated with the viewfinder hole 11, a bottom wall of the groove forms step surfaces 14 on both sides of the viewfinder hole 11 of the mounting base 1, a limit block 15 is provided on each side wall of the groove, and the light shielding piece 2 is located between the step surfaces 14 and the limit block 15. The channel between the step surface 14 and the limit block 15 is for the light shielding piece 2 to pass through, thereby preventing the light shielding piece 2 from warping, and the side wall of the groove defines a sliding direction of the light shielding piece 2.

In addition, the bridge type contact power supply lens shielding element 100 also includes a cover plate 7 provided with an avoidance hole 71 corresponding to the viewfinder hole 11. The cover plate 7 covers the mounting base 1 at a side of the mounting base 1 away from the camera 200, and buckled with the mounting base 1. The cover plate 7 is detachably buckled with the mounting base 1, which facilitates the assembly, disassembly and maintenance of the bridge type contact power supply lens shielding element 100. The cover plate 7 is covered on an opening side of the mounting cavity 13 to prevent the driving assembly 3 from dust and protect the driving assembly 3.

The mounting base 1 is provided with a plurality of positioning protrusions 18, and the cover plate 7 is provided with a plurality of positioning holes 73. The number of positioning protrusions 18 is equal to that of the positioning holes 73 and the positioning protrusions 18 and the positioning holes 73 correspond one by one to ensure the position accuracy of the cover plate 7 during mounting.

Specifically, the cover plate 7 can be made of metal. A plurality of hooks 72 are provided on both sides of the cover plate 7, and a plurality of blocks 19 are provided on the left and right sides of the mounting base 1. The number of hooks 72 is equal to the number of blocks 19, and the hooks 72 are buckled with the blocks 19 one by one.

In addition, the present application also provides an electronic device, which includes a bridge type contact power supply lens shielding element 100 as described above. Since the electronic device includes the bridge type contact power supply lens shielding element 100 as described above, the electronic device has all the beneficial effects of the bridge type contact power supply lens shielding element 100, which will not be described again.

The above is only the preferred embodiment of the present application and does not limit the patent scope of the present application. Under the inventive concept of the present application, the equivalent structural transformation made by using the contents of the description and attached drawings of the present application, or direct/indirect application in other relevant technical fields, is included in the patent claimed scope of the present application.

The invention claimed is:
1. A shielding element for bridge type contact power supply lens, provided on a Printed Circuit Board (PCB) of an electronic device and covering a camera of the electronic device, comprising:
   a mounting base covering the camera, and a viewfinder hole provided on the mounting base corresponding to a viewfinder side of the camera;
   a light shielding piece slidably connected with the mounting base;
   a driving assembly comprising a driving mechanism and a swing arm rotatably connected with the mounting base, the swing arm being connected with the light shielding piece, and the driving mechanism being configured to drive the swing arm to rotate to drive the light shielding piece to move back and forth between a first position and a second position;
   two metal reinforcing plates provided on two opposite sides of the camera, and embedded in the mounting base; and
   a contact conductive copper piece passing through the mounting base, one end of the contact conductive copper piece being conductive with the driving mechanism, and another end of the contact conductive copper piece being abutted against a conductive contact point of the PCB,
   wherein when the light shielding piece is located at the first position, the light shielding piece covers the viewfinder hole a side of the viewfinder hole away from the camera, when the light shielding piece is located at the second position, the camera is exposed from the viewfinder hole.

2. The shielding element for bridge type contact power supply lens according to claim 1, wherein the mounting base is integrally-formed, and the metal reinforcing plates are provided in the mounting base; or the mounting base is provided with mounting grooves matched with the metal reinforcing plates, and the metal reinforcing plates are embedded in the mounting grooves in an one to one correspondence.

3. The shielding element for bridge type contact power supply lens according to claim 1, wherein the contact conductive copper piece comprises a substrate and a abutting part connected with the substrate, a width of the abutting part is greater than a width of the substrate, the substrate passes through the mounting base, and an end of the substrate away from the abutting part is connected with the driving mechanism; the abutting part is exposed from the mounting base, and bent to form a contact surface abutted against the conductive contact point.

4. The shielding element for bridge type contact power supply lens according to claim 1, wherein the swing arm comprises a cylindrical part, an extension arm and a traction part;

wherein the mounting base is provided with a positioning shaft and the cylindrical part is sleeved on the positioning shaft;
wherein the extension arm is extended from an outer wall of the cylindrical part and extended outward along a radial direction of the cylindrical part; and
wherein the traction part is provided at an end of the extension arm away from the cylindrical part, the traction part passes through a sliding groove on the light shielding piece.

5. The shielding element for bridge type contact power supply lens according to claim 4, wherein the swing arm further comprises a limit blocking piece connected with the traction part, and the light shielding piece is located between the limit blocking piece and the extension arm.

6. The shielding element for bridge type contact power supply lens according to claim 4, wherein the driving mechanism comprises an iron core and coils, the iron core comprises a base and two opposite connecting arms, the base is connected between ends of the two connecting arms, and the coils are sleeved on the two connecting arms in an one by one correspondence, an end of each connecting arm away from the base is arc-shaped and form a mounting position between the two connecting arms; and wherein the swing arm also comprises an annular magnet provided coaxially with the cylindrical part, and the magnet is provided at the mounting position.

7. The shielding element for bridge type contact power supply lens according to claim 6, wherein the swing arm further comprises a sleeve part provided at an end of the cylindrical part and rotatably sleeved on the positioning shaft, and the magnet is fixedly sleeved on the sleeve part.

8. The shielding element for bridge type contact power supply lens according to claim 1, wherein a side of the mounting base away from the camera is provided with a groove communicated with the viewfinder hole, a bottom wall of the groove forms step surfaces on both sides of the viewfinder hole of the mounting base, limit blocks are provided on both side walls of the groove, and the light shielding piece is located among the step surfaces and the limit blocks.

9. The shielding element for bridge type contact power supply lens according to claim 1, further comprising a cover plate provided with an avoidance hole corresponding to the viewfinder hole, the cover plate being provided on a side of the mounting base away from the camera, and buckled with the mounting base.

10. An electronic device, comprising the shielding element for bridge type contact power supply lens according to claim 1.

\* \* \* \* \*